United States Patent [19]

Moddel et al.

[11] Patent Number: 5,178,445
[45] Date of Patent: Jan. 12, 1993

[54] OPTICALLY ADDRESSED SPATIAL LIGHT MODULATOR

[76] Inventors: Garrett Moddel, 2444-9th St. #2; Mark A. Handschy, 3230-11th St., both of Boulder, Colo. 80304

[21] Appl. No.: 364,073

[22] Filed: Jun. 9, 1989

[51] Int. Cl.$^5$ ............................................. G02F 1/13
[52] U.S. Cl. ....................................... 359/85; 359/62; 359/72; 359/104
[58] Field of Search ............... 350/355, 334, 342, 386, 350/332, 350S

[56] References Cited

U.S. PATENT DOCUMENTS

| | | | |
|---|---|---|---|
| 3,824,002 | 7/1974 | Beard | 350/342 |
| 4,191,452 | 3/1980 | Grinberg et al. | 350/342 |
| 4,239,348 | 12/1980 | Grinberg et al. | 350/342 |
| 4,367,924 | 1/1983 | Clark et al. | 350/334 |
| 4,538,884 | 9/1985 | Masaki | 350/361 |
| 4,563,059 | 1/1986 | Clark et al. | 350/330 |
| 4,619,501 | 10/1986 | Armitage | 350/386 |
| 4,655,554 | 4/1987 | Armitage | 350/386 |
| 4,693,561 | 9/1987 | Ashley | 350/336 |
| 4,859,035 | 8/1989 | Ichinose et al. | 350/332 |
| 4,909,607 | 3/1990 | Ross | 350/332 |
| 4,941,735 | 7/1990 | Moddel et al. | 350/342 |

OTHER PUBLICATIONS

U. Efron et al. "The silicon liquid-crystal light valve", J. Appl. phys. 57 Feb. 15, 1985, pp. 1356-1368.
D. Armitage et al., "Gallium arsenide photoaddressed liquid-crystal spatial light modulator", SPIE vol. 936, pp. 56-67.
Optical Society of America Technical Digest 1988 Annual Meeting, Amosa Wednesday afternoon/118.
Paul R. Ashley and Jack H. Davis, "Amorphous silicon photoconductor in a liquid crystal spatial light modulator", Applied Optics, vol. 26, No. 2, Jan. 15, 1987.
Paul R. Ashley et al., "Liquid-Crystal spatial light modulator with a transmissive amorphous silicon photoconductor", Applied Optics, vol. 27, No. 9, May 1, 1988.
Garrett Moddel et al., "Optical and Digital Pattern Recognition", A Reprint from the Proceedings of SPIE, vol. 754, Jan 13-15, 1987, Los Angeles, Calif.
G. Moddel et al., "Advances in Optical Information Processing III", A Reprint from the Proceedings of SPIE, vol. 936, Apr. 6-8, 1988, Orlando, Fl.
G. Moddel et al, "Optical Addressing of High-Speed Spatial Light Modulators With Hydrogenated Amorphous Silicon", Mat. Res. Soc. Symp. Proc. vol. 118, pp. 405-410.
D. Williams et al, "An Amorphous silicon/chiral smectic spatial light modulator", J. Phys. D: Appl. Phys. 21 (1988), pp. S156-S159.
SCE-9 Data Sheet Jan. 03, 1988, 2pages.
Ashley et al., "Liquid Crystal Spatial Light Modulator With A Transmisive Amorphous Silicon Photoconductor", May 1988, Applied Optics, vol. 27, No. 9. pp. 1797-1802.

*Primary Examiner*—Andrew J. James
*Assistant Examiner*—Sara W. Crane
*Attorney, Agent, or Firm*—Cushman, Darby & Cushman

[57] ABSTRACT

The present invention relates to an optically addressed spatial light modulator with high spatial resolution and a fast response. The spatial light modulator includes photoresponsive layers of amorphous silicon and light modulating layers of ferroelectric liquid crystals (FLCs). The present invention is particularly charactierized in that the problems due to large capacitances of thin layers of the amorphous silicon and FLC are overcome by preventing excessive spurious signals from being applied to the light modulating layer. This is accomplished by combining thin light modulating with thick photoresponsive layers, using asymmetric driving waveforms, using slow driving waveforms combined with conductive light modulators, and by using suitable materials constants such as high polarization or high dielectric constant FLCs. According to such arrangements, the characteristic response time of the light modulator for a reversal of an applied electric field polarity is substantially shorter than its characteristic response time caused by the removal of an applied electric field. Also, the present invention has the benefit that when the state of the electrical driver is changed from a first state to a second state so as to switch the light modulator from a first optical state to a second optical state, charges are prevented from accumulating on the light modulator so as to prevent spurious signals.

6 Claims, 8 Drawing Sheets

OPTICALLY ADDRESSED SPATIAL LIGHT MODULATOR

This invention was made with Government support under contract N60921-88-C-0088 awarded by the Department of the Navy. The Government has certain rights in this invention.

BACKGROUND OF THE INVENTION (a) Field of the Invention

This invention relates to optically addressed spatial light modulators, which are electro-optical devices whereby a writing light controls the modulation of a reading light according to the image pattern existing in the writing light beam. Such devices have many uses such as, for example, allowing an image illuminated with light of weak intensity to be projected with light of strong intensity, converting an image in light of one wavelength to an image in light of another wavelength, or converting an image in incoherent light to an image in coherent light.

(b) Description of the Prior Art

Examples of electro-optic devices which allow the modulation of light to be controlled by light, and which specifically make use of spatial variation or the image content of the controlling light, are generally known in the prior art. The type most similar to that of the present invention is frequently called a liquid crystal light valve. These devices comprise a liquid crystal light modulating layer in contact with a photoresponsive layer, typically a photoconductor Changes in the light illuminating the photoresponsive layer (write light) cause corresponding changes in the electric fields applied to the liquid crystal layer, further causing corresponding changes in light passing through the liquid crystal (read light).

Typical liquid crystal light valves, such as the one disclosed in U.S. Pat. No. 3,824,002, use nematic liquid crystals as the light modulator. Nematic liquid crystals have several advantages for use in these devices in that they exhibit large modulations for relatively small changes in applied voltage and their operation consumes very little electrical power. However, nematic liquid crystals respond only to changes in the magnitude but not in the polarity of applied electric fields. Therefore, although they can be switched in one direction increasingly fast by increasingly large applied fields, switching them in the opposite direction can only be accomplished by removing the electric field. The switching then proceeds under the drive of comparatively small surface elastic forces. The combination of the small surface elastic forces with the nematic liquid crystal's viscosity limits the response speed of all such devices to the millisecond range, as is well known in the art. Also, nematic liquid crystal layers used are typically 5-20 $\mu$m thick, which limits the spatial resolution as well, for it is not possible to switch regions of the liquid crystal that are much smaller in extent than the thickness of the film.

The liquid crystal light valves of the prior art also typically use photo-conductive materials such as the CdS layer taught by U.S. Pat. No. 3,824,002 for their photoresponsive layers. While such photoconductors are usually very sensitive, producing changes in the charge of many electrons for every absorbed photon, they are also usually slow, taking several milliseconds to respond to changes in their illumination level. Furthermore, many of the easiest to use photoconductive materials exhibit significant responses only to light of relatively short wavelengths as found in the blue end of the visible spectrum.

Alternately, other disclosures in the prior art such as that by Efron et al., "The silicon liquid-crystal light valve," Journal of Applied Physics, volume 57, p. 1356 (1985), that by Armitage et al., "Gallium arsenide photoaddressed liquid-crystal spatial light modulator," Advances in Optical Information Processing III, Dennis R. Pape, editor, Proceedings SPIE, volume 936, pp. 56-67 (1988) and those of U.S. Pat. Nos. 4,191,452, 4,239,348, 4,619,501, and 4,655,554 teach the use of crystalline silicon or gallium arsenide as the photoresponsive layer. These materials have favorable response times and are sensitive to longer wavelengths, but they have their own disadvantages. For example, they must be fabricated in single crystal form, which is difficult and expensive. Also, since a wafer of these semiconductors is obtained by sawing from a large single crystal, it is not possible to obtain thin, optically flat layers as desired for the liquid crystal light valve. Moreover, the only way to obtain reasonable spatial resolution with such a thick layer is to add further patterns of doping and metal deposition. Such additional steps are difficult and produce a light valve whose resolution is limited by the resolution of the patterning steps.

In the operation of any liquid crystal light valve, care must be taken that the reading or projection light does not also write the device. Devices of the prior art have typically used one of two methods to accomplish this isolation. The first method involves placing a dielectric mirror of high reflectivity at the interface between the photoresponsive layer and the liquid crystal, as taught in U.S. Pat. No. 3,824,002. By reflecting or blocking substantially all of the light incident from the liquid crystal side of the device from reaching the photoresponsive layer, the reading and writing functions can be separated. However, such a dielectric mirror, in order to be efficient, must be at least as thick as several wavelengths of the light it is to reflect, and thus it comprises many layers. Also, no matter how fine a pattern of electric charge can be generated at the surface of the photoresponsive layer, the electric fields resulting across the liquid crystal layer can change substantially over distances comparable to the thickness of the mirror layer, thereby limiting the resolution of the device. The second method involves placing a metal mirror at the same interface. However, since metals conduct electricity, the mirror must be patterned if the device is to be able to respond to images. Methods of fabricating such a device are taught in U.S. Pat. No. 4,538,884. Again, the maximum resolution achievable is equal to the resolution with which the metal mirror can be patterned.

Most of the devices of the prior art are constituted such that continuing modulation of the read light requires continuing illumination by the writing light. Such a requirement prevents the desirable function of integration, whereby further increments of exposure to the write light produce more or less irreversible increments in the modulation of the read light. Photographic film provides such an integration function whose advantages are readily apparent to those skilled in the art. However, film requires the separate and time consuming extra step of development.

Both fast liquid crystal light modulators and fast photoresponsive layers are separately known in the prior art. For example, U.S. Pat. Nos. 4,367,924 and 4,563,059 teach the use of chiral tilted smectic liquid crystals which are ferroelectric. These ferroelectric liquid crystals (hereafter "FLCs") have the property, unlike nematics, of being sensitive to the sign or polarity of an applied electric field. This allows them to have two states, into either of which they can be driven by externally applied electric fields, thereby obviating the need to rely on the much weaker internal surface elastic forces. FLCs can be switched in microseconds, which is quite fast compared to the nematics' millisecond switching time. However, FLCs cannot simply be substituted for nematics in an optically addressed spatial light modulator. As pointed out by Armitage et al in "Photoaddressed ferroelectric liquid crystal devices," Optical Society of America Annual Meeting, 1988, Technical Digest Series, Volume 11 (Optical Society of America, Washington, D.C., 1988), p. 118, photoaddressing structures that are effective in addressing nematic liquid crystal cells often prove ineffective for addressing ferroelectric liquid crystal cells.

Photoresponsive layers of hydrogenated amorphous silicon (hereafter a-Si:H) have been investigated extensively over the past two decades, with much work directed toward their use in photovoltaic solar cells. As is known in the art, a-Si:H photoresponsive layers are used in vidicons and photocopy drums. The material may be used either with ohmic contacts, as a photoconductor, or with rectifying layers, as a photodiode, as in the solar cells. The photodiodes are known to have microsecond response times to changes in illumination. Use of a-Si:H combined with nematic liquid crystals in optically addressed spatial light modulators is taught in U.S. Pat. No. 4,538,884 to Masaki and U.S. Pat .No. 4,693,561 to Davis and in Ashley et al, "Amorphous silicon photoconductor in a liquid crystal spatial light modulator," Applied Optics, vol. 26, pp. 241–246 (1987) and "Liquid crystal spatial light modulator with a transmissive amorphous silicon photoconductor," Applied Optics, vol. 27, pp. 1797–1802 (1988).

Finally, Moddel et al. disclose in "Photoaddressing of High Speed Liquid Crystal Spatial Light Modulators," Optical and Digital Pattern Recognition, Hua-Kuang Liu and Paul Schenker, editors, Proceedings SPIE, vol. 754, pp. 207–213 (1986); "Design and Performance of High-speed Optically-addressed Spatial Light Modulators," Advances in Optical Information Processing III, Dennis R. Pape, editor, Proceedings SPIE, vol. 936, pp. 48–55 (1988); and "Optical Addressing of High-speed Spatial Light Modulators with Hydrogenated Amorphous Silicon," Materials Research Society Proceedings, vol. 118, pp. 405–410 (1988) and Williams et al. disclose in "An Amorphous Silicon/Chiral Smectic Spatial Light Modulator," Journal of Physics D: Applied Physics, vol. 21, pp. 156–159 (1988), the use of liquid crystal light valves having photoresponsive layers made of a-Si:H and having light modulating layers made of FLCs. Such devices appear to have the potential for overcoming many of the short-comings of the prior art devices recited above. Namely, both the photoresponsive layer and the light modulating layer are thin so as to support a high spatial resolution and fast switching, thereby allowing response times in the microsecond range.

However, those skilled in the art will appreciate that the devices disclosed in the above publications have their own difficulties. Specifically, the a-Si:H layer has a large capacitance, which makes it difficult to take such a device from an erased state to a light sensitive state. The necessary changes in the applied voltages feed through the layer's capacitance and write the liquid crystal layer even in the absence of writing illumination. Moddel et al teach that this problem may be solved by reducing the amplitude of the driving voltage waveform. Unfortunately, this also increases the optically addressed spatial light modulator's response time since the FLC responds more slowly to a smaller applied voltage.

SUMMARY OF THE INVENTION

The principal object of the present invention is to provide an optically addressed spatial light modulator with high spatial resolution and a fast response.

The desire for high resolution in a device that is easy to fabricate requires that the photoresponsive and light modulating layers be thin. The desire for high speed dictates that both layers also have short response times. These requirements are met in the present invention by photoresponsive layers of amorphous silicon (a-Si:H) and light modulating layers of ferroelectric liquid crystals (FLCs). Further, in the present invention the semiconducting a-Si:H is made into rectifying diodes, which gives rise to advantageous embodiments when the a-Si:H layer is coupled to a light modulator whose action depends on the sign of the voltage applied to it, as is the case for FLCs. The a-Si:H can also be deposited on a variety of substrates such as optically flat windows.

Amorphous silicon is responsive to visible light but is transparent and insensitive to near infrared light. This allows the isolation of the read and write light in devices of the present invention by having the read light at a comparatively long wavelength in the near infrared such as is readily obtained from a semiconductor LED or laser diode and by having the write light at a comparatively short wavelength in the visible spectrum, which may be obtained from any of the multitude of sources known in the art. These devices can then be read in reflection in the usual way, or, since the photoresponsive layer is transparent, in transmission.

The devices of the present invention are divided into types according to whether or not the photoresponsive layer is rectifying. Devices made with ohmic or nonrectifying layers are generally more sensitive to write light, but somewhat slower. Devices with rectifying layers are generally faster. Rectifying photoresponsive layers also allow devices whose total modulation of the read light is determined by the total integrated exposure of the device to write light.

The differences between the way FLCs of the present invention and prior art light modulators respond to electrical driving signals causes devices in accordance with the present invention to differ significantly from light valves in the prior art. Within certain limitations, the FLC light modulating layer may be characterized as having a switching threshold defined by the integrated product of the applied voltage multiplied by elapsed time. Thus, it switches rapidly in response to high voltages, and more slowly in response to low voltages. Further, once the FLC has switched, the return of the applied voltage to zero does not induce the FLC to switch back to its original slate, i.e., the FLC has memory. In the case of the surface-stabilized FLC (SSFLC), as taught by Clark and Lagerwall in U.S. Pat. Nos. 4,367,924 and 4,563,059, the memory is indefinitely long. Even without surface stabilization, the forces tending to drive the FLC to any given state are usually small compared to the force produced by the applied voltage; therefore, the FLC's relaxation away from the voltage-selected state is slow compared to its switching speed. Thus, under any condition where the FLC has a fast switching time, it has a long memory time compared to the switching time.

By contrast, nematics have a definite threshold in r.m.s. applied voltage below which little or no optical response is produced even if the voltage is applied for a long time. Their response depends only on the magnitude and is thus independent of the sign of the applied voltage. Thus, practical devices are configured so that with zero voltage applied they spontaneously turn off, and the spontaneous turn-off time is usually about equal to the turn-on time. Other light modulators including solid-state electrooptic materials have very fast turn-on times and equally fast turn-off times.

However, FLC has the disadvantage that it is much more sensitive to spurious or undesired electrical signals than other light modulators. With other light modulators, if some small amplitude or short duration spurious signal should produce some unwanted light modulation, the magnitude of the unwanted light modulation will typically be small, since the response will either be small or of short duration. However, with FLCs, their fast response time coupled with their long memory time and their low switching threshold for signals of long duration can result in even small or short spurious signals producing a large unwanted optical modulation.

Therefore, the main obstacle in making optically addressed spatial light modulators from thin layers in accordance with the present invention is that the large capacitance of the layers tends to result in spurious signals being applied to the light modulator whenever the applied voltage is changed. For light modulators that respond to the sign of the applied voltage, changes are necessary to allow light modulation. The present invention solves these problems by preventing excessive spurious signals from being applied to the light modulating layer. This is accomplished by judicious combination of thin light modulating and thick photoresponsive layers, use of asymmetric driving waveforms, use of slow driving waveforms combined with conductive light modulators, and use of suitable materials constants, such as high polarization or high dielectric constant FLCs.

DETAILED DESCRIPTION OF THE PREFERRED EMBODIMENTS

The present invention will now be described with reference to the drawings.

Figure 1:
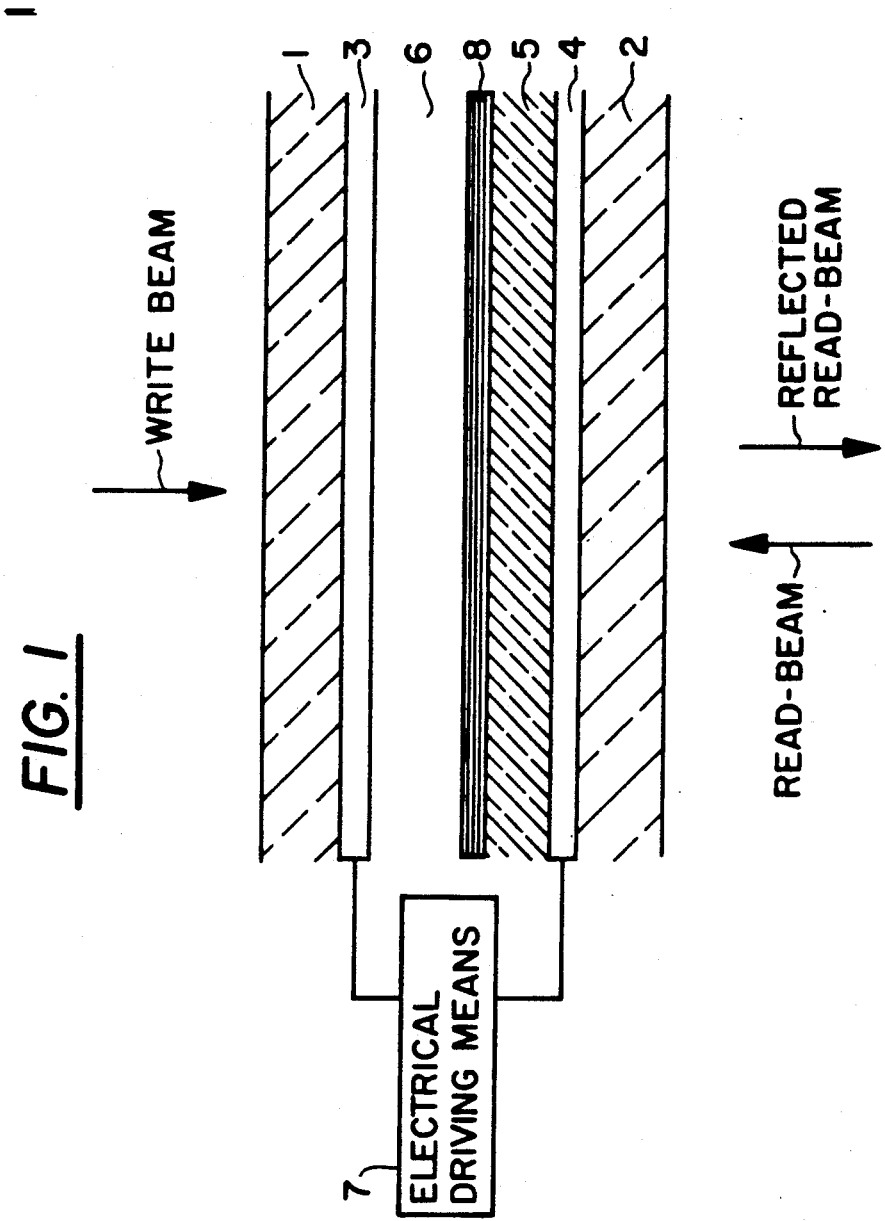
FIG. 1 represents a generalized structure of the optically addressed spatial light modulator of the present invention.

FIG. 1 shows the basic structure of the optically addressed spatial light modulator of the invention. It comprises two transparent substrates 1 and 2, typically glass, each coated with a partially transparent electrode (3 and 4), and faced together with a light modulating layer 5 and a photoresponsive layer 6 therebetween. Leads connect each plate's electrode to a terminal of an electrical driving means 7. The light to be modulated can either be directed through both the photoresponsive layer 6 and the light modulating layer 5 for operation in transmission, or it can be directed once through the light modulating layer 5, reflected at the interface between the light modulating layer 5 and the photoresponsive layer 6, and then back through the light modulating layer 5 again for operation in reflection. The device's performance in reflection operation may be enhanced by the addition of a light reflecting layer 8 at the interface between the photoresponsive layer 6 and light modulating layer 5. Each layer will be described in turn below, as well as how they may be combined into useful devices.

TRANSPARENT ELECTRODES 3 AND 4

The required transparent electrodes may be deposited on the substrate plates by a variety of methods known in the art. For example, they may be made of tin oxide or of indium-tin oxide deposited by vacuum evaporation, sputtering, or spray pyrolysis. They may also be made of a metal, deposited by vacuum evaporation or sputtering, provided the metal is deposited in a layer thin enough to allow significant optical transmission. The metal chromium is particularly useful for this function as it adheres well to glass and does not diffuse readily into the a-Si:H. Consideration in the choice of the transparent electrode on the plate having the photoresponsive layer must be given to the properties of the interface between the a-Si:H and the electrode, specifically if an ohmic or rectifying contact is formed. Generally, high work function metals, e.g., platinum, will form a rectifying Schottky barrier interface. The art for the formation of ohmic contacts depends upon both the a-Si:H deposition conditions as well as on the properties of the contact material.

LIGHT MODULATING LAYER 5

A useful light modulating layer would have the properties of fast response to low drive voltage and complete optical modulation in a thin layer so as to give high spatial resolution. Ferroelectric liquid crystal (FLC) layers have these properties, so the preferred embodiments of the present invention will be described with reference to these materials, although other materials may be found that could equally well be used to make devices employing the teachings of the present invention.

Figure 2:
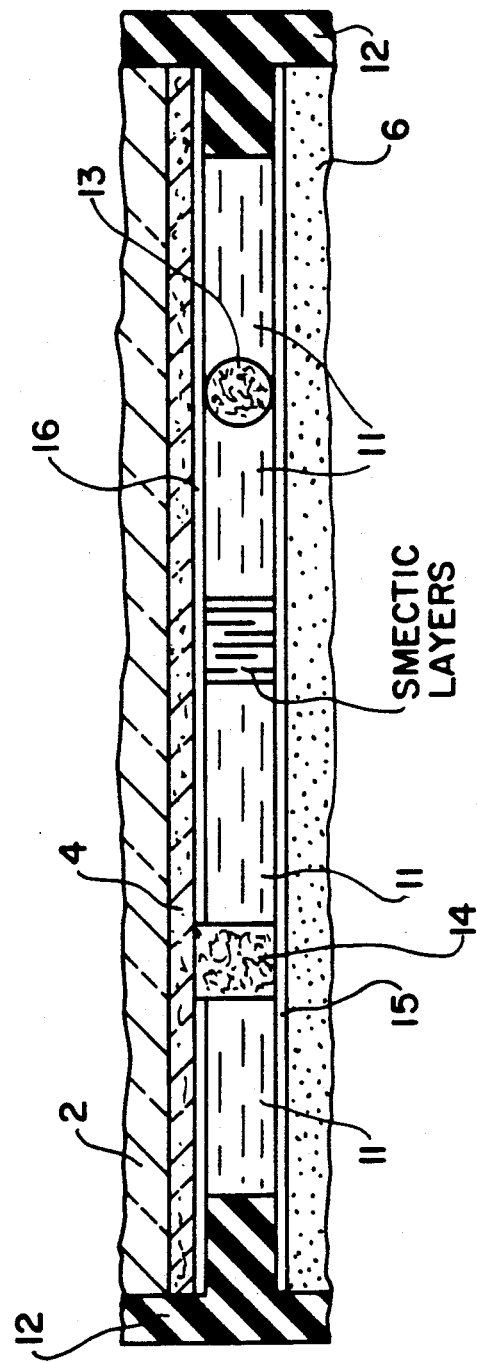
FIG. 2 shows the structure of the FLC light modulating layer with a gap between the surfaces of the photoresponsive layer and the transparent conductively coated substrate filled with FLC having smectic layers.

FIG. 2 shows in more detail a typical FLC light modulating layer. This layer comprises a film of FLC material 11 in the gap between the photoresponsive layer 6 and the transparent conductively coated glass substrate 2. The edge of the gap may be sealed with a gasket 12 that also helps define the gap spacing. Distributed spacer particles 13 or deposited spacer pads 14 within the gap may be used to further define the gap spacing. The FLC-facing surfaces of the photoresponsive layer 6 and of the transparent conductor 4 are further coated with "alignment" layers 15 and 16 to orient the intersections of the FLC's smectic layers with the bounding layers parallel to a common direction. The discussion below describes each of these elements in more detail; however, the discussion is largely a summary of the prior art as taught in U.S. Pat. Nos. 4,367,924 and 4,563,059 and in U.S. patent application Ser. No. 108,799, for example, and numerous other documents and publications well known to those skilled in the art.

FLC Materials. Many suitable FLC materials are available commercially. For example, the material SCE-9 sold by the British Drug House may be used as the FLC material of the invention which has a spontaneous polarization value of 33.6 nC/cm$^2$. This material, like most commercially available ones, has a non-tilted smectic A phase at temperatures above its ferroelectric tilted smectic C phase, followed by a nematic phase, and eventually an isotropic liquid phase (I) at still higher temperatures. The presence of the smectic A and nematic (N) phases are generally regarded to ease the FLC's alignment, although materials with the I-N-C and I-A-C phase sequence are known and have been successfully used as light modulators. The strength of the ferroelectricity of these materials is characterized by the magnitude of their spontaneous polarization P, with FLC materials having any value of P between 0 and 300 nC/cm$^2$ being readily available. The switching time $\tau$ of the material is greatly influenced by the value of P, having the approximate dependence r $\tau \approx \eta/PE$, where $\eta$ is the FLC's orientation viscosity and E is the magnitude of the applied electric field. FLCs have strongly anisotropic dielectric properties, which are characterized by a low frequency anisotropy $\Delta\epsilon$ of the dielectric constants and a refractive index anisotropy or birefringence $\Delta n$. The torques produced by applied electric fields on the spontaneous polarization P reorient the anisotropy axes of the FLC, and hence change the refractive indices, which is the mechanism of the optical modulation used in the preferred embodiments of the present invention.

The anisotropy axis of the FLC is tilted an angle $\psi$ from the smectic layering direction; therefore, the application of oppositely directed electric fields in the plane of the smectic layers changes the preferred orientation of this axis from one position on the $\psi$-defined cone to the diametrically opposite one. In the absence of any applied field, the axis prefers to helix about the layering direction, meaning that a thick FLC film returns to a helixed configuration upon the removal of the switching electric field. U.S. Pat. Nos. 4,367,924 and 4,563,059 teach that this helical structure can be permanently unwound by making the FLC film thin enough and that devices made in this manner have the useful property of memory, i.e., that once an electric field switches the anisotropy axis to a given orientation, it will not switch back either to the helixed state or to the state selected by the oppositely directed field upon removal of the switching field. This property can be useful in devices of the present invention as described further below.

Spacing. Being partly fluid in nature, the FLC material 11 will fill the gap allotted to it between the surfaces of the photoresponsive layer and the glass substrate 2, as shown in FIG. 2. Since the FLC film's optical and electrical properties depend strongly on its thickness, maintaining a gap of a uniform and desired thickness is essential to the operation of the device of the present invention. The gap between the confining surfaces can be defined by placing a spacing gasket 12 of the desired thickness around the edge of the gap and/or distributing spacers 13 and 14 throughout the gap. The spacing gasket 12 may also be formed of a sealing material and used to prevent the entrance of unwanted materials into the gap after it is filled with the FLC. The distributed spacers 13 can be formed by a number of techniques. For example, they could be formed by evaporating a patterned layer of oxide (e.g. SiO, SiO$_2$, etc.) or by spinning and patterning a layer of a polymer such as polyimide onto one of the confining surfaces. Alternately, the spacers 13 may be comprised of particles such as glass fibers or polymer spheres of the desired size which are deposited onto the surfaces from a liquid or gas suspension. Once the gap is formed, the FLC material may be introduced into it from its edge by relying on capillary forces. This filling technique is aided by heating the FLC to its isotropic liquid phase and by evacuating the air from the gap prior to filling.

Alignment. Modulation of light with an FLC film is most conveniently accomplished if the projection of the smectic layering direction onto the plane of the film does not vary much in direction throughout the modulator. This alignment may be achieved by a variety of different methods. The most practical methods rely on the application of an anisotropic coating to the FLC-confining surfaces, as shown in FIG. 2. Many of the similar coatings used for aligning nematic liquid crystals, as reviewed by Jaques Cognard in "*Alignment of Nematic Liquid Crystals and Their Mixtures*", (Gordon and Breach, New York, 1982), can also be used for FLCs. In particular, rubbed polymer layers and obliquely evaporated oxides may be used.

PHOTOSENSITIVE LAYER 6

Unpatterned photoresponsive layers are generally simpler to make than patterned ones, with high spatial resolutions being achieved with thin unpatterned layers. Efficient photoresponse then dictates that the layer have a high optical absorption so that substantially all incident writing light is absorbed in spite of the layer's thinness. For this reason, many materials such as indirect bandgap semiconductors cannot be used in the invention. The photoresponsive layer should also be susceptible to a fabrication method which allows it to be easily made in an optically flat form. This has been difficult to accomplish with most semiconductors grown in single-crystal form, but it is practical with materials that can be deposited in a non-single-crystal form on an already flat substrate. Amorphous silicon (a-Si:H) exhibits these desirable properties; therefore, the further features of the invention will be described with respect to this material, although other photoresponsive layers that meet the above criteria are possible and might equally well be used in devices embodying the teachings of the invention.

Amorphous silicon may be combined with several elements to modify it in useful ways. For example, the incorporation of boron or other electronically similar elements provides p-type doping, while the incorporation of phosphorous or other electronically similar elements provides n-type doping. Hydrogen ties up deleterious dangling bonds in the material, and other elements such as fluorine provide similar benefits Alloying the a-Si:H with carbon increases the bandgap and reduces the absorption of visible light, while alloying with germanium reduces the bandgap and extends the optical absorption into the near infrared.

The a-Si:H can be deposited on the plate by methods well known in the art for making, e.g., photovoltaic solar cells. For instance, the method of plasma enhanced chemical vapor deposition (PECVD) may be used where the substrate is loaded into a vacuum chamber between two electrode plates and heated to 250° C. Silane and various other gases are admitted into the chamber. A radio-frequency voltage then is applied across the two plates, creating a plasma from which the silicon, hydrogen, and other elements are deposited onto the plate. To deposit a p-type layer, diborane is admitted along with the silane. Optionally, methane may also be admitted to produce a silicon-carbon alloy which improves the performance of the p-type layer by increasing its bandgap and thereby reducing its optical absorption. This reduced absorption is desirable to decrease the light lost in the relatively "dead" doped region from which it is difficult to collect the photoproduced carriers. To deposit an intrinsic layer only silane is admitted, and for the n-type layer silane and phosphine are admitted. The addition of germane (GeH4) to the deposition atmosphere results in an a-SiGe:H alloy with optical absorption extended into the infrared. The p- and n-type layers in a photodiode may not contain Ge, which reduces the doping efficiency.

Figure 3:
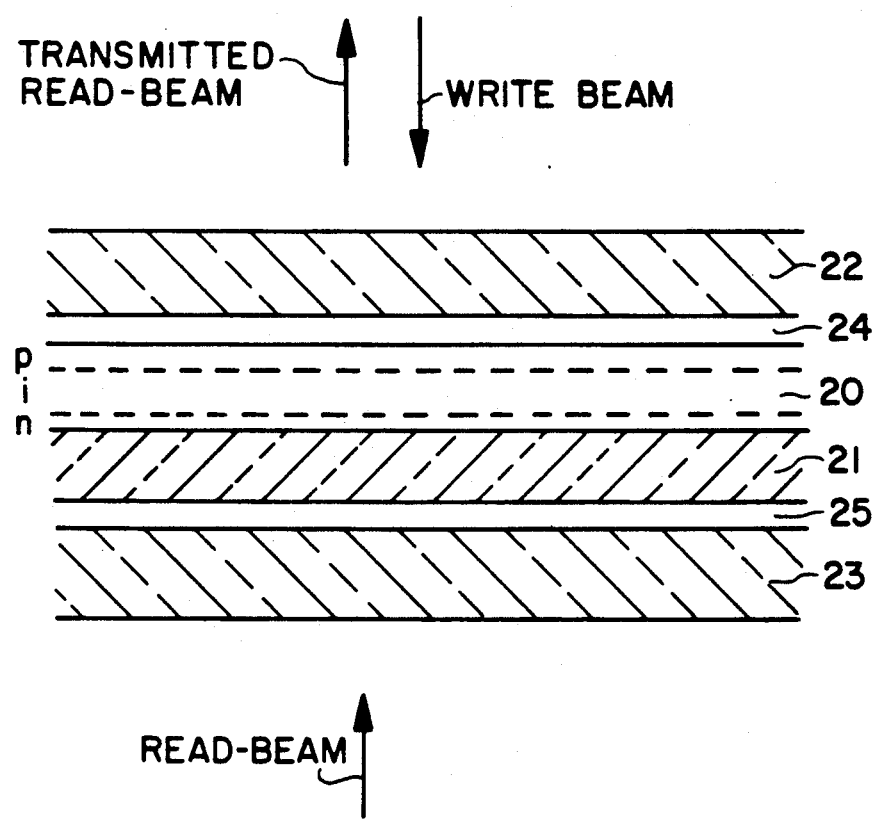
FIG. 3 represents the structure of an embodiment of an optically-addressed spatial light modulator with a rectifying photosensitive layer.
Figure 7:
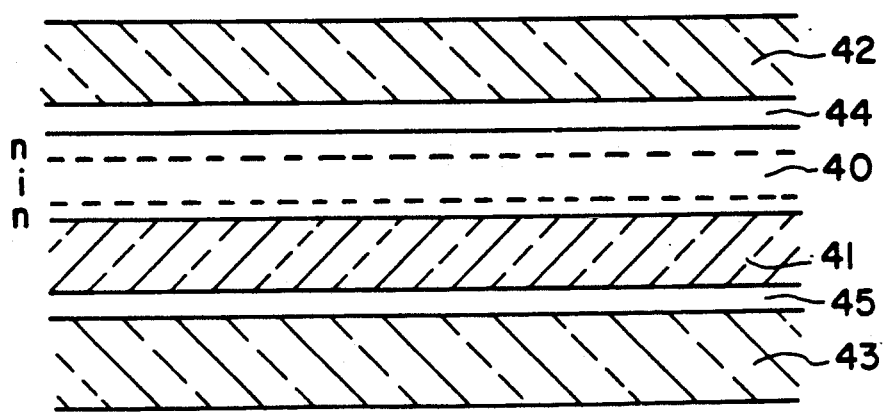
FIG. 7 represents the structure of an embodiment of an optically-addressed spatial light modulator with a nonrectifying photoresponsive layer.

Either rectifying or nonrectifying photoresponsive layers may be obtained by the above techniques. Rectifying layers are formed by sequentially depositing n-type, intrinsic or i-type, and p-type a-Si:H on the substrate already having the transparent electrode (FIG. 3). Either p-i-n or n-i-p structures can be made. Alternately, the same rectifying function can be obtained by the formation of a heterojunction between the a-Si:H and the transparent electrode layer, for example, a-Si:H on tin oxide or a-Si:H on a thin metal layer, which forms a Schottky barrier junction. Nonrectifying layers, on the other hand, are formed by depositing a-Si:H on an electrode to which it makes ohmic contact. Such contact may be facilitated by first depositing a doped layer of a-Si:H. Thus, nonrectifying layers may have the structure p-i-p or n-i-n in addition to the simplest pure i-type layer, as shown in FIG. 7.

REFLECTOR 8

When desired, a reflector may be deposited on the surface of the photoresponsive layer 6. Two types of reflectors are generally known in the art, the first being made from dielectric materials and the second being made from metals. Many techniques are known for making dielectric reflectors, for example, by the sequential evaporation of alternate layers of silicon nitride and magnesium fluoride, each layer having an optical thickness of one quarter of the wavelength of the light to be reflected. The reflector should be thin since a thick reflector may reduce the device's spatial resolution. High reflectance is obtained from a thin reflector when the refractive indices of the sequentially deposited layers have a large difference. Techniques for making multilayer dielectric reflectors with reduced sensitivity to the wavelength or incidence angle of the light are well known in the art and may be used if desired.

How a-Si:H photoresponsive layers, FLC light modulating layers, and electrical driving means are combined to produce useful optically addressed spatial light modulators will now be described with respect to FIGS. 3–9.

SLMs WITH RECTIFYING PHOTORESPONSIVE LAYERS

FIGS. 3–6 relate to a spatial light modulator (SLM) with rectifying photoresponsive layers in accordance with a first embodiment of the invention.

FIG. 3 shows in cross-section the structure of an optically addressed SLM having a rectifying a-Si:H photoresponsive layer 20, which operates as a photodiode, but no reflector. A light modulating ferroelectric liquid crystal (FLC) layer 21 operating in transmission is confined between glass substrates 22 and 23 coated with transparent conducting oxide (TCO) layers 24 and 25, respectively. One substrate is also coated with a hydrogenated amorphous silicon (a-Si:H) p-i-n photodiode light sensing layer.

Figure 4:
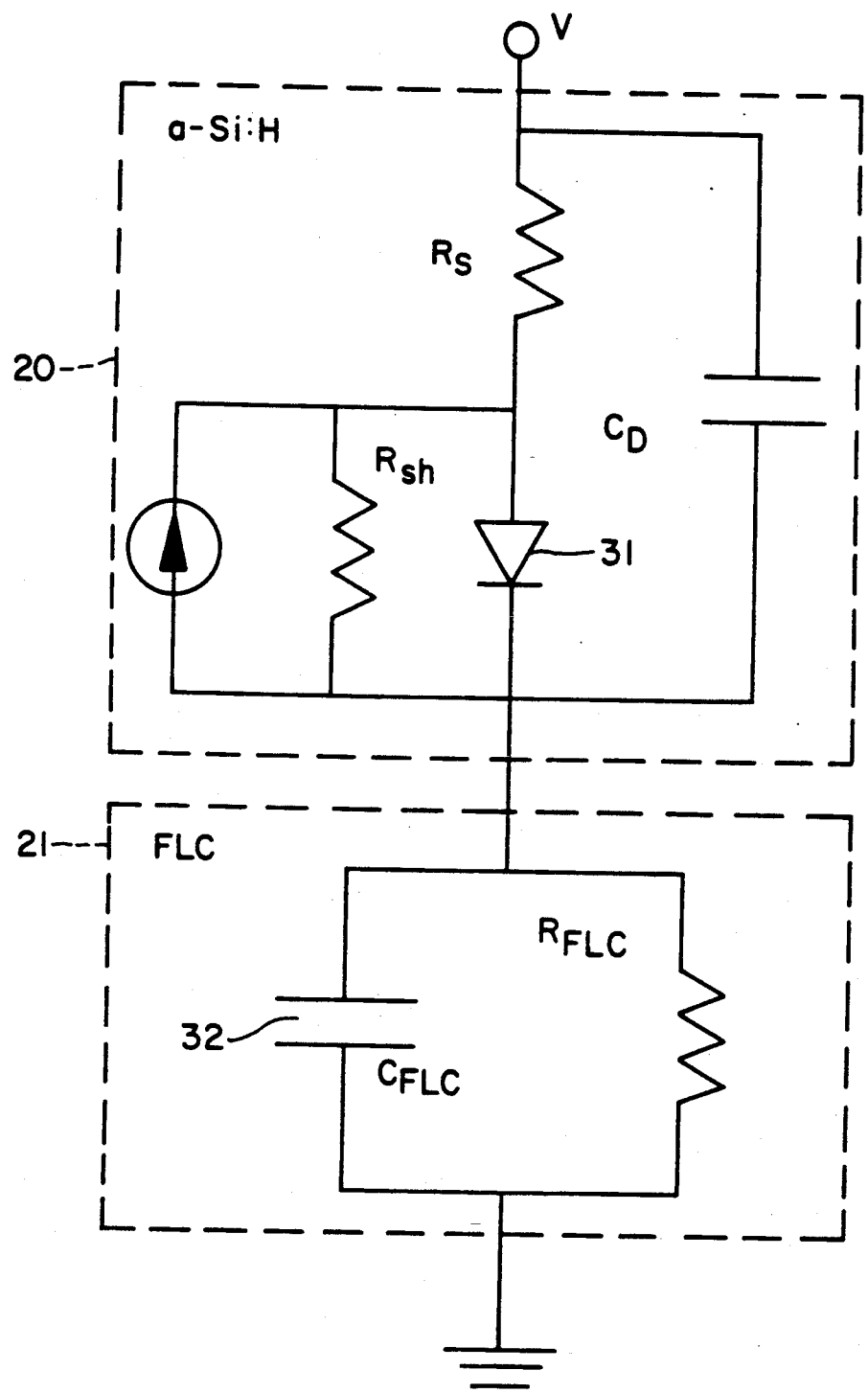
FIG. 4 is an equivalent circuit of the rectifying spatial light modulator of FIG. 3.

FIG. 4 shows a schematic model of the equivalent circuit elements of a single pixel. In FIG. 4, the a-Si:H p-i-n photodiode light sensing layer of a-Si:H photoresponsive layer 20 is represented as an illumination dependent current source in parallel with a shunt resistance $R_{sh}$ and an ideal diode 31, which parallel combination is in series with a photoresistor $R_s$. The photodiode equivalent circuit also includes a parallel capacitance $C_p$. The FLC equivalent circuit, on the other hand, consists of a nonlinear capacitance $C_{FLC}$ and parallel resistance $R_{FLC}$.

Figure 5A:
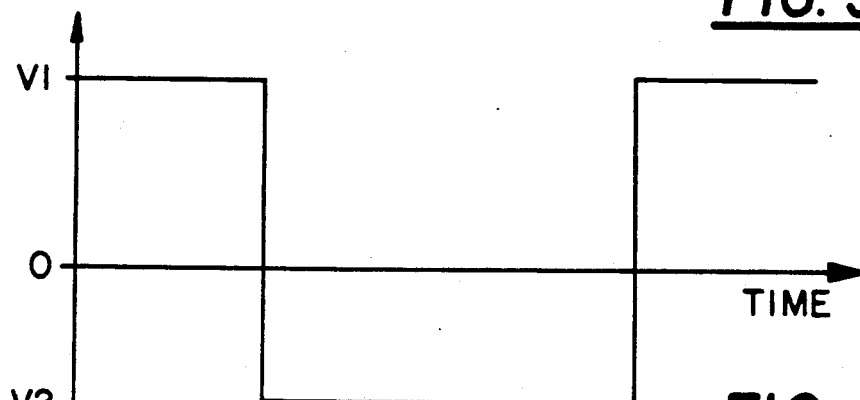
FIG. 5 including parts (a), (b), (c), and (d), shows voltage versus time waveform diagrams of the voltage provided by the electrical driver to the rectifying spatial light modulator as well as the resulting voltage across the FLC light modulator and the transmitted read light intensity for the shown write light intensity waveform.
Figure 5B:
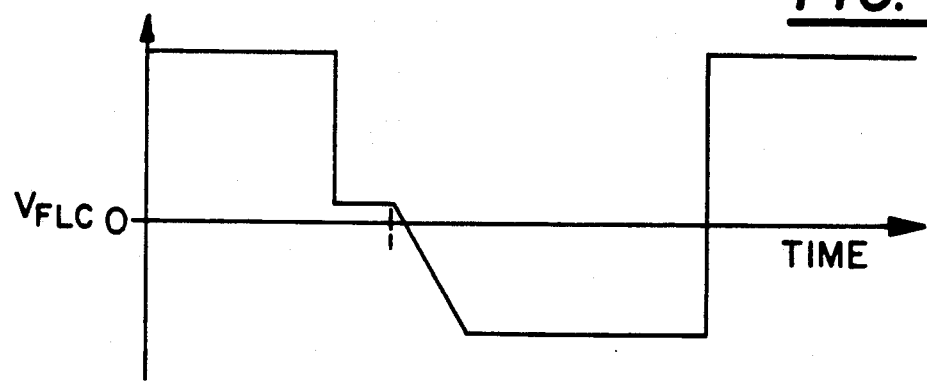
Figure 5C:
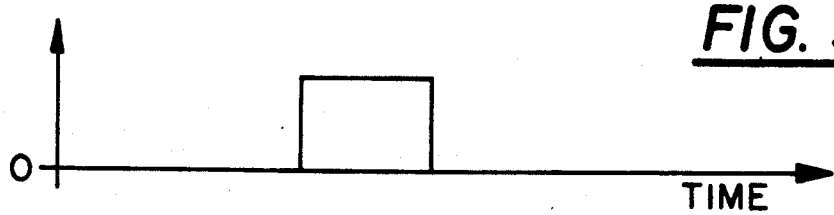
Figure 5D:
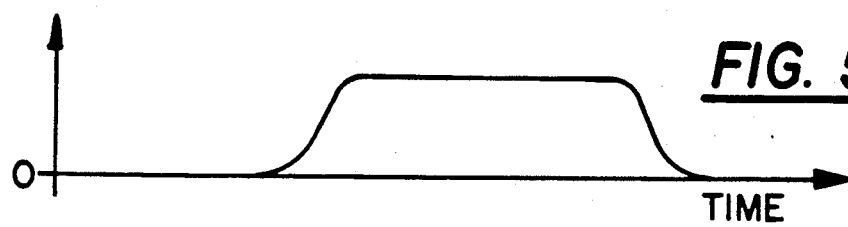

FIGS. 5(a)–(d) show the voltage produced by the electrical driving means 7 across the SLM (FIG. 5(a)) and the optical input (write light) (FIG. 5(c)) and output (read light) (FIG. 5(d)) along with the voltage produced across the FLC light modulator (FIG. 5(b)).

The operation of the SLM consists of cycling the electrical driving means 7 through states for which the SLM is alternately erased and writable. During the positive applied voltage V1 part of the cycle (FIG. 5(a)), the a-Si:H diode 20 is forward biased, and it conducts electric current more or less independently of the level of write illumination so as to provide a uniform positive voltage across the FLC light modulating layer 21. The FLC of the FLC light modulating layer 21 then assumes a uniform optical state, which for future reference will be called the "erased" state. The electrical driving means 7 then reduces the applied voltage to V2 (FIG. 5(a)). This reverse biases the photodiode 20, which no blocks current except when and where it is illuminated by write light (FIG. 5(c)). There, a photocurrent proportional to the write illumination flows, applying a negative voltage to the FLC and switching it to the "written" state. In unilluminated regions, the voltage across the FLC stays as it was immediately after the change of the applied voltage to value V2. The FLC thus stays in the erased state.

The rectifying nature of the photodiode allows the FLC capacitor 32 to stay charged to the written state even after the cessation of the write light. Additional memory can be obtained by surface-stabilizing the FLC as taught by U.S. Pat. Nos. 4,367,924 and 4,563,059, so that this desirable property of integration may be retained even if, e.g., the diode 20 exhibits some reverse leakage.

The writing light must be of a wavelength short enough to produce electron-hole pairs in the diode 20, i.e., of an energy greater than the a-Si:H's band gap energy. The reading operation can be accomplished without unwanted writing of the SLM by using a sufficiently long wavelength at which no photocharge is produced. At these wavelengths where the light energy is well below the band gap energy, the a-Si:H is substantially transparent so as to facilitate the operation of the SLM in transmission. The refractive index mismatch at the FLC/a-Si:H interface will produce an appreciable reflection, so the SLM may also be read in reflection without further modification. However, the reflection can be greatly increased by the addition at this interface of a reflecting layer 8 as in FIG. 1.

Figure 6:
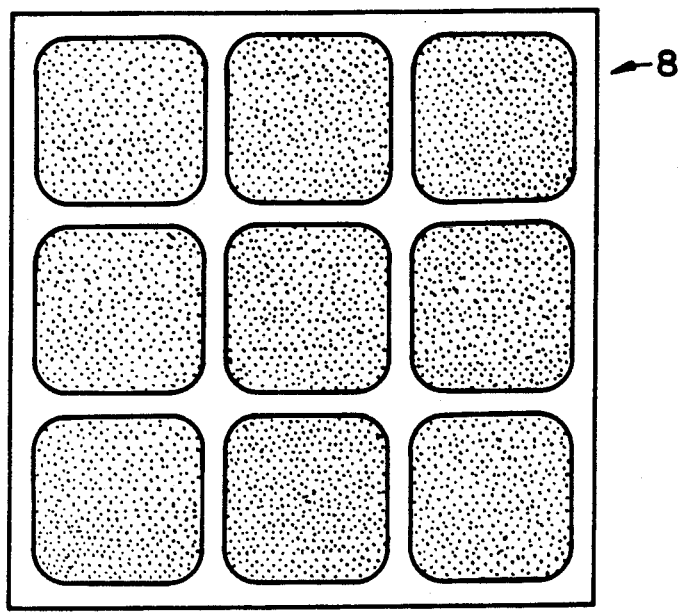
FIG. 6 shows a pattern of the metal layer for reflective pixels in accordance with the invention.

The reflecting layer 8 might consist either of a metal layer patterned into separate pixels, as shown in FIG. 6, or a stack of dielectric layers. The metal layer must be patterned into separate pixels as in FIG. 6 since it is a good enough conductor to short regions of different writing illumination together. The dielectric reflector would be made from alternating layers of low and high refractive index transparent materials by using designs and depositions techniques well known to those skilled in the art. It is desirable to have the dielectric layer be no thicker than necessary, since layers substantially thicker than the a-Si:H or FLC layers will degrade the resolution, as well as the switching properties as described below. If the reflector 8 effectively prevents read light from reaching the photoresponsive layer 21, then the reading and writing actions can be independent of each other regardless of wavelength, with reading light being directed toward the SLM from the side of the light modulating layer 21, and writing light being directed from the side with the photoresponsive layer 20. A metal reflector 8 that completely blocks the reading light can easily be constructed by simply depositing it in a thick enough layer. The dielectric reflector may require a foundation of a separate light blocking layer. Semiconductors such as cadmium telluride used for this purpose are known by those skilled in the art.

The further memory achieved from the surface-stabilized property of the FLC can be exploited to allow isolation of the read and write operations by their separation in time. For example, if after the SLM is written, during the state where the driving voltage has value V2, the driving voltage is reduced to zero, then further illumination can act only to reduce the magnitude of the voltage across the FLC towards the small open circuit voltage of the photodiode 20. Since this small voltage cannot quickly switch the FLC, the SLM may be read with light of any wavelength during a time after the voltage is brought to zero. Thus, even a transmission SLM, or a reflection SLM without a light blocking layer can be written and read with the same wavelength of light by confining the reading and writing illuminations to the appropriate part of the driving cycle.

Additional subtleties of the operation of the SLM can be understood with reference to FIG. 4. During forward bias, the circuit shown in the figure would produce a voltage $V_{FLC}$ across the FLC given by $$V_{FLC} = V1 \frac{R_{FLC}}{R_{FLC} + R_S}, \quad (1)$$

where $R_{FLC}$ is the resistance measured across a unit area of the FLC film, and $R_S$ is the effective series resistance measured across a unit area of the forward-biased photodiode 20. If the SLM is suddenly reversed biased by switching the applied voltage from V1 to V2, the voltage initially appearing across the FLC is given by $$V_{FLC} = (V2 - V1) \frac{C_D}{C_D + C_{FLC}} + V1 \frac{R_{FLC}}{R_{FLC} + R_S}, \quad (2)$$

where $C_D$ is the capacitance per unit area of the a-Si:H photodiode 20 and $C_{FLC}$ is the capacitance per unit area of the FLC layer 21. If the applied voltage remains at V2, in the absence of write illumination, the FLC voltage approaches $$V_{FLC} = V2 \frac{R_{FLC}}{R_{FLC} + R_{sh}}, \quad (3)$$

where $R_{sh}$ is the effective resistance shunting a unit area of the photodiode 20. With strong writing illumination, $V_{FLC}$ approaches V2. As these equations indicate, the relative values of the resistance and capacitance values can be manipulated to change the voltages appearing across the FLC during various parts of the driving cycle.

It is desirable to have a large positive voltage across the FLC during the erase part of the cycle, and a large negative voltage across the FLC during the write part of the cycle only where the FLC is illuminated by write light, while in the unwritten regions the FLC voltage remains positive or zero. The desired condition during the erase part of the cycle can be obtained by minimizing the photodiode 20's series resistance $R_S$, as shown by equation (1), where the voltage seen by the FLC approaches the applied voltage V1 as $R_S$ becomes small compared to $R_{FLC}$. This condition is easy to achieve in practice, with typical FLC layer resistances $R_{FLC}$ being greater than 1 M$\Omega$-cm$^2$, and typical a-Si:H photodiode series resistances $R_S$ being smaller than 1 k$\Omega$-cm$^2$.

More care is required with the capacitances. As can be seen from equation (2), a fraction of any voltage change tending to bring the diode 20 to reverse bias appears across the FLC, tending to switch it to the written state even in the absence of writing illumination. This unwanted writing may be prevented in several ways. The obvious way wherein the first term of equation (2) is made small (by making $|V2-V1|$ small) is undesirable, since then the magnitude of the voltage that can be applied to a written area of the FLC is small, and hence its switching will be slow. However, making the second term of equation (2) large by making V1 large is effective. Thus, assuming negligible $R_S$, the FLC capacitor 32 is initially charged up to a large positive voltage V1. Then, if the voltage V1 is large enough that the fraction V1/(V1−V2) exceeds the capacitance fraction $C_D/(C_D+C_{FLC})$, the voltage across the unwritten regions of the FLC will remain positive. The voltage V2 can thereby be chosen to be negative enough to obtain fast switching in the written regions where the applied voltage approaches V2.

Alternately, any method that reduces the voltage change produced across the FLC for a given change in charge deposited on the FLC will allow the use of more negative V2 values, and hence produce faster switching without undesired switching to the written state in the absence of writing illumination. The capacitance of the FLC can be increased by choosing FLC materials of high dielectric constants. Further, since the switching of the FLC from the erased state to the written state consumes a charge per unit area of approximately 2P, the use of high polarization materials is also advantageous. Finally, the capacitance of the FLC layer 21 can be increased by reducing its thickness d. In most optical system configurations using the SLMs of the present invention, the light modulation effected by the SLM is a function of $\Delta n d/\lambda$, where $\Delta n$ is the previously mentioned birefringence of the FLC material, and $\lambda$ is the vacuum wavelength of the light being modulated. Hence, to preserve a given level of optical modulation while reducing the thickness d, it is desirable to commensurately increase the birefringence $\Delta n$ by choosing an appropriate FLC material.

The above analysis of the voltage appearing across the FLC layer 21 upon changes in the applied voltage has been predicated upon the FLC having a negligibly large shunt resistance $R_{FLC}$. To neglect the effects of this resistance we require that the time constant equal to $R_{FLC} C_D \| C_{FLC}$ be long compared to the time in which the voltage changes are effected. Within that limit, the final voltage change across the FLC layer 21 is substantially independent of the duration of the change. If the duration of the change is long compared to the above time constant, then the amplitude of the change appearing across the FLC is proportionately attenuated. This provides another mechanism for increasing the magnitude of voltage V2 without causing correspondingly large voltages to appear across the FLC in the absence of writing light. The resistance of the FLC layer 21 can be reduced by adding ionic agents to the FLC material. For example, quaternary ammonium salts such as hexadecyltrimethylammonium bromide are known in the art to dissolve in typical liquid crystal materials and thereby increase their electrical conductivity.

The use of photoresponsive layers with low capacitance is also an advantage with regard to reducing the unwanted voltage appearing across the FLC upon change of the driving voltage from the forward to reverse direction. In the case of the present a-Si:H photodiode 20, this can be accomplished simply by increasing the thickness of the intrinsic layer to minimize its ordinary capacitance and by depositing a-Si:H with a sufficiently low density of gap states to make its depletion capacitance negligible.

SLMs WITH NONRECTIFYING PHOTORESPONSIVE LAYERS

Figure 8:
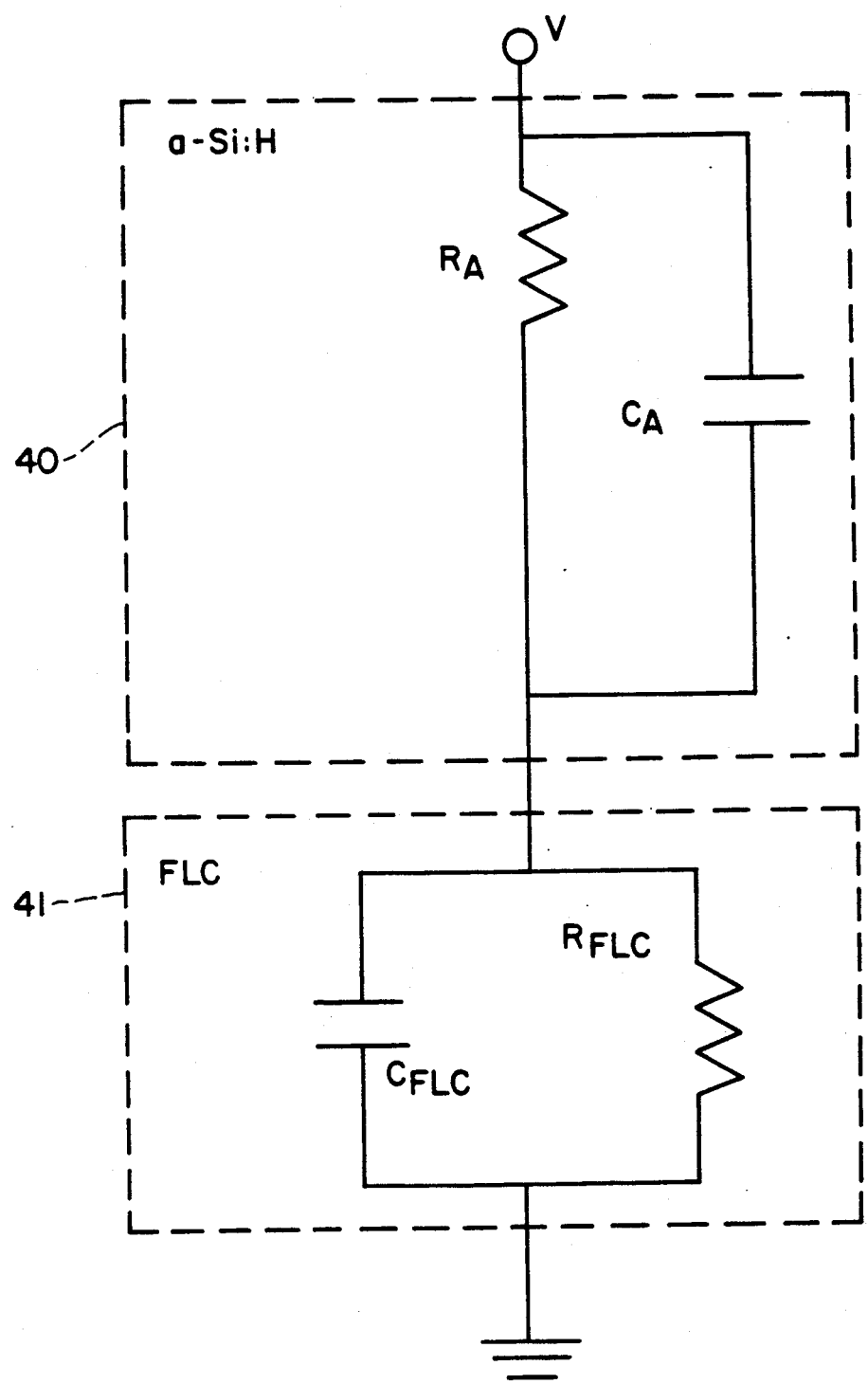
FIG. 8 shows an equivalent circuit of the nonrectifying spatial light modulator of FIG. 7.

FIGS. 7-9 relate to an SLM with nonrectifying photoresponsive layers in accordance with a second embodiment of the invention.

FIG. 7 shows in cross-section the structure of an optically addressed SLM having a nonrectifying, photoconductive a-Si:H photoresponsive layer 40 but no reflector. As shown, a light-modulating ferroelectric liquid crystal (FLC) layer 41 operating in transmission is confined between glass substrates 42 and 43 coated with transparent conducting oxide (TCO) layers 44 and 45, respectively. One substrate is also coated with a hydrogenated amorphous silicon (a-Si:H) n-i-n photoconductive light sensing layer.

FIG. 8 shows a schematic model of the equivalent circuit elements of a single pixel. In FIG. 8, the a-Si:H n-i-n photoconductor is represented as an illumination dependent resistor $R_A$ in parallel with a capacitance $C_A$. The FLC equivalent circuit again consists of a nonlinear capacitance $C_{FLC}$ and parallel resistance $R_{FLC}$.

Figure 9A:
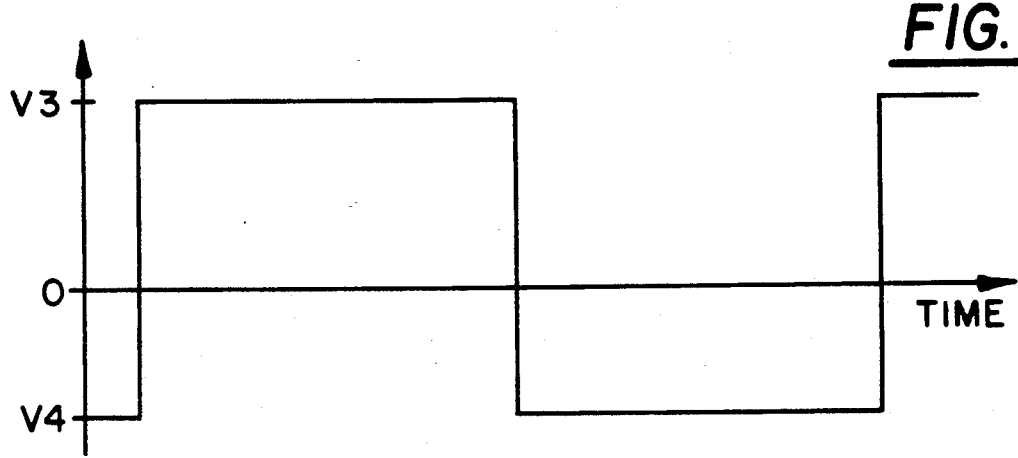
FIG. 9 including parts (a), (b), (c), and (d), shows voltage versus time waveform diagrams of the voltage provided by the electrical driver to the nonrectifying spatial light modulator as well as the resulting voltage across the FLC light modulator and the transmitted read light intensity for the shown write light intensity waveform.
Figure 9B:
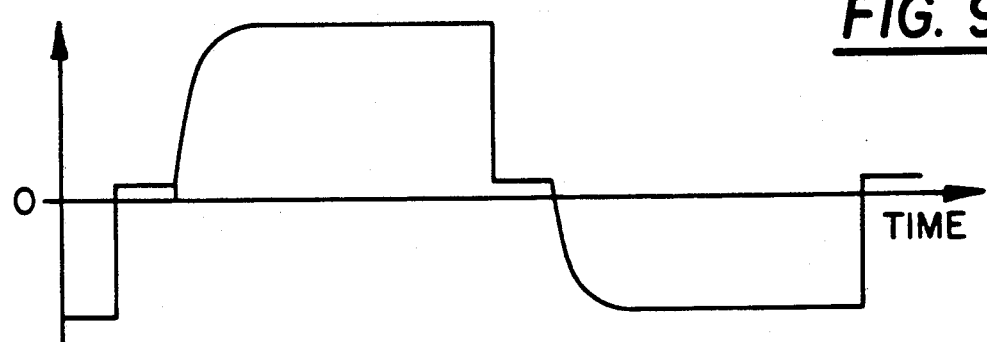
Figure 9C:
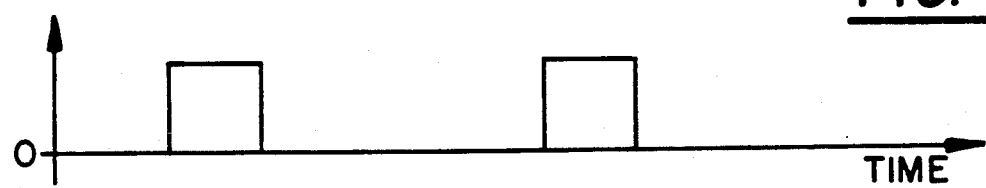
Figure 9D:
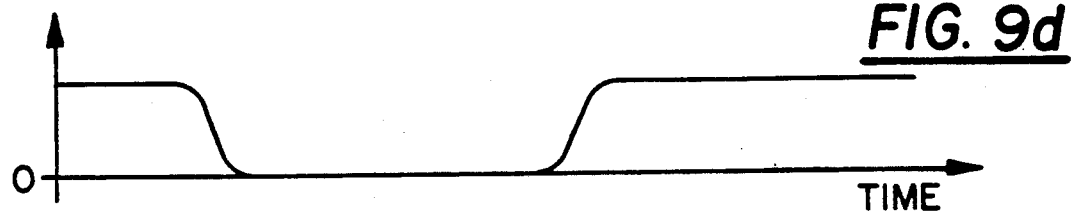

FIGS. 9(a)-(d) show the voltage produced by the electrical driving means 7 across the SLM (FIG. 9(a)) and the optical input (write light) (FIG. 9(c)) and output (read light) (FIG. 9(d)) along with the voltage produced across the FLC light modulator (FIG. 9(b)).

The operating characteristics of SLMs of this structure differ in several regards from those with rectifying photoresponsive layers, as described above with respect to FIGS. 3-6. In the absence of writing illumination, the photoresistor $R_A$ assumes a large value, and the voltage changes produced across the FLC layer 41 are only those resulting from the charge coupled through the capacitance $C_A$ upon change in the driving voltage. Thus, in SLMs of this type, the full applied voltage V1 during the erase part of the cycle does not appear across the FLC in the absence of write illumination.

This SLM is again operated by cycling the electrical driving means 7 through states applying voltage which allow the FLC layer 41 to alternately be erased and written. Positive voltage V3 (FIG. 9(a)) is applied to allow erasure. To obtain the full erase, voltage across the FLC must be illuminated with write light while voltage V3 is applied (FIG. 9(c)). The electrical driving means 7 then reduces the applied voltage to value V4. Part of the voltage change appears immediately across the FLC by the capacitive dividing mechanism discussed above with respect to the rectifying SLM. The remainder is available for writing the FLC when and where write illumination is provided. The immediately appearing part of the voltage change is undesirable since it tends to write the FLC in the absence of writing illumination if V4 is strongly negative, as desired for fast writing. The unwanted voltage appearing across the FLC may be made smaller by all of the steps prescribed above for the rectifying SLM, i.e., by making $|V3| > |V4|$, by increasing the charge capacity of the FLC layer through increases in its dielectric constant, by ferroelectric polarization P, by decreases in its thickness d (desirably accompanied by increases in its birefringence $\Delta n$), by decreasing the capacitance of the photoresponsive layer by making it thicker, or by increasing the conductivity of the FLC and making the changes in the applied voltage of a duration which is long compared to the RC time constant of the SLM.

The SLM may again be operated in transmission with the isolation of the writing and reading operations accomplished by making the reading light of too long wavelength to write but of such a wavelength that the photoresponsive layer 40 is transparent, or in reflection with the isolation of the writing and reading operations accomplished by placing a light-blocking reflector at the interface between the FLC layer 41 and the photoresponsive layer 40. Similarly to the rectifying SLM, the changes in applied voltage produced by the capacitance are generally undesirable, and can cause unwanted writing and erasure of the FLC when the driving voltage amplitudes are increased to the values needed for fast switching.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An electro-optic device comprising:

light modulating means for modulating light to have a first optical state when an electric field of a first polarity is applied and to have a second optical state different from said first optical state when an electric field of a second polarity opposite said first polarity is applied, a characteristic response time of said light modulating means for a reversal in applied electric field polarity being substantially shorter than its characteristic response time due to the removal of an applied electric field, photoresponsive means, and electrical driving means for applying a driving voltage to said light modulating means and photoresponsive means, said light modulating means, photoresponsive means, and electric driving means being connected electrically in series and said electrical driving means having a first state for allowing said light modulating means to assume said first optical state and a second state for allowing said light modulating means to be switched from said first optical state to said second optical state according to an intensity of a writing light illuminating said photoresponsive means, said light modulating means, photoresponsive means, and electrical driving means being arranged so that when the state of said electrical driving means is changed from said first state to said second state, charge sufficient to switch said light modulating means from said first optical state to said second optical state is prevented from accumulating on said light modulating means unless said intensity of writing light received by said photoresponsive means is sufficient to place said photoresponsive means in a predetermined conductivity state, wherein said electrical driving means applies a first voltage in said first state and a second voltage in said second state, a magnitude of said first voltage being substantially larger than a magnitude of said second voltage.

2. An electro-optic device comprising:

light modulating means for modulating light to have a first optical state when an electric field of a first polarity is applied and to have a second optical state different from said first optical state when an electric field of a second polarity opposite said first polarity is applied, a characteristic response time of said light modulating means for a reversal in applied electric field polarity being substantially shorter than its characteristic response time due to the removal of an applied electric field, photoresponsive means, and electrical driving means for applying a driving voltage to said light modulating means and photoresponsive means, said light modulating means, photoresponsive means, and electric driving means being connected electrically in series and said electrical driving means having a first state for allowing said light modulating means to assume said first optical state and a second state for allowing said light modulating means to be switched from said first optical state to said second optical state according to an intensity of a writing light illuminating said photoresponsive means, said light modulating means, photoresponsive means, and electrical driving means being arranged so that when the state of said electrical driving means is changed from said first state to said second state, charge sufficient to switch said light modulating means from said first optical state to said second optical state is prevented from accumulating on said light modulating means unless said intensity of writing light received by said photoresponsive means is sufficient to place said photoresponsive means in a predetermined conductivity state, wherein said light modulating means is conductive and said electrical driving means changes states more slowly than the characteristic self-discharge of said conductive light modulating means.

3. An electro-optic device comprising:

light modulating means, comprising a layer of ferroelectric liquid crystal, for modulating light to have a first optical state when an electric field of a first polarity is applied and to have a second optical state different from said first optical state when an electric field of a second polarity opposite said first polarity is applied, a characteristic response time of said light modulating means for a reversal in applied electric field polarity being substantially shorter than its characteristic response time due to the removal of an applied electric field, photoresponsive means, and electrical driving means for applying a driving voltage to said light modulating means and photoresponsive means, said light modulating means, photoresponsive means, and electric driving means being connected electrically in series and said electrical driving means having a first state for allowing said light modulating means to assume said first optical state and a second state for allowing said light modulating means to be switched from said first optical state to said second optical state according to an intensity of a writing light illuminating said photoresponsive means, said light modulating means, photoresponsive means, and electrical driving means being arranged so that when the state of said electrical driving means is changed from said first state to said second state, charge sufficient to switch said light modulating means from said first optical state to said second optical state is prevented from accumulating on said light modulating means unless said intensity of writing light received by said photoresponsive means is sufficient to place said photoresponsive means in a predetermined conductivity state, wherein said ferroelectric liquid crystal has a high spontaneous polarization, greater than or equal to 33.6 nC/cm$^2$.

4. An electro-optic device comprising:

light modulating means for modulating light to have a first optical state when an electric field of a first polarity is applied and to have a second optical state different from said first optical state when an electric field of a second polarity opposite said first polarity is applied, photoresponsive means, and electrical driving means for applying a driving voltage to said light modulating means and photoresponsive means, said light modulating means, photoresponsive means, and electric driving means being connected electrically in series and said electrical driving means applying a first voltage V1 for allowing said light modulating means to assume said first optical state and a second voltage V2 for allowing said light modulating means to be switched from said first optical state to said second optical state according to an intensity of a writing light illuminating said photoresponsive means, said light modulating means, photoresponsive means, and electrical driving means being arranged so that when the state of said electrical driving means is changed from said first state to said second state charge sufficient to switch said light modulating means from said first optical state to said second optical state is prevented from accumulating on said light modulating means, unless said intensity of writing light received by said photoresponsive means is sufficient to place said photoresponsive means in a predetermined conductivity state, wherein capacitances of said photoresponsive means and of said light modulating means are such that $$\frac{V1}{(V1 - V2)} > \frac{C_D}{(C_D + C_{FLC})}$$

wherein $C_D$ is a capacitance per unit area of said photoresponsive means, and $C_{FLC}$ is a capacitance per unit area of said light modulating means.

5. An electro-optic device as in claim 4 wherein a magnitude of said first voltage is substantially larger than a magnitude of said second voltage.

6. A method of forming and using an electro-optic device comprising the steps of:

forming a light modulating means for modulating light to have a first optical state when an electric field of a first polarity is applied and to have a second optical state different from said first optical state when an electric field of a second polarity opposite said first polarity is applied, said light modulating means having a capacitance per unit area $C_D$;

forming a photoresponsive means, having a capacitance per unit area $C_{FLC}$;

connecting said light modulating means and photoresponsive means electrically in series to form a series circuit and applying a first voltage V1 to said series circuit for allowing said light modulating means to assume said first optical state and a second voltage V2 to said series circuit for allowing said light modulating means to be switched from said first optical state to said second optical state according to the intensity of a writing light illuminating said photoresponsive means;

arranging said light modulating means, photoresponsive means, and electrical driving means so that when the state of said electrical driving means is changed from said first state to said second state charge sufficient to switch said light modulating means from said first optical state to said second optical state is prevented from accumulating on said light modulating means unless said intensity of writing light received by said photoresponsive means is sufficient to place said photoresponsive means in a predetermined conductivity state; and forming said capacitances of said photoresponsive means and of said light modulating means such that $$\frac{V1}{(V1 - V2)} > \frac{C_D}{(C_D + C_{FLC})}.$$

* * * * *